United States Patent [19]

Frechet

[11] Patent Number: 5,214,105
[45] Date of Patent: May 25, 1993

[54] PREPARATION OF GRAFT COPOLYMERS FROM MACROMOLECULES CONTAINING REACTIVE TERTIARY STRUCTURES

[75] Inventor: Jean M. J. Frechet, Ithaca, N.Y.

[73] Assignee: University of Ottawa, Ontario, Canada

[21] Appl. No.: 774,838

[22] Filed: Oct. 11, 1991

Related U.S. Application Data

[62] Division of Ser. No. 152,720, Feb. 5, 1988, Pat. No. 5,084,522.

[51] Int. Cl.$^5$ .......................................... C08F 257/02
[52] U.S. Cl. ................................. 525/245; 525/242; 525/244; 525/251; 525/289; 525/312; 525/319; 525/918
[58] Field of Search ............... 525/244, 245, 251, 289, 525/312, 319, 242, 918

[56] References Cited

U.S. PATENT DOCUMENTS

| | | | |
|---|---|---|---|
| 2,534,193 | 12/1950 | Emerson | 526/347 |
| 3,234,196 | 2/1966 | Leavitt | 526/293 |
| 3,933,942 | 1/1976 | Kennedy et al. | 525/319 X |
| 3,954,709 | 5/1976 | Stewart et al. | 526/336 |
| 4,107,238 | 8/1978 | Roper et al. | 260/880 |

FOREIGN PATENT DOCUMENTS

| | | | |
|---|---|---|---|
| 2161859 | 6/1972 | Fed. Rep. of Germany | 526/348.7 |
| 2236384 | 2/1973 | Fed. Rep. of Germany | 526/348.7 |

OTHER PUBLICATIONS

J. M. J. Frechet and K. E. Hague, Tetrahedron Letters 1975, pp. 3055-3056.
H. Hayatsu et al., J. Am. Chem. Soc., 89, 1967, 3880-87.
English Translation of Japanese Kokai Pat. No. 61-188407 to Asanuma et al., published Aug. 22, 1986.
Styrene Polymers: Technology and Environmental Aspects, Brighton et al., Applied Science, London, 248-269, 1979.
Smets et al., "Cationic Reactions . . . ", The Chemistry of Cationic Polymerization, Plesch (ed.), Pergamon Press, 606-607 (1963).
Adv. Org. Chem., J. March (3rd ed.) J. Wiley and Sons, N.Y., 896-915, 1977.
Polymer Handbook Brandrup et al. (1st ed.) Intersciences, N.Y., II-214-15, II-238-39, 1967.
The Chemistry of Acid Derivatives Pt. 2, S. Patai (ed.) J. Wiley and Sons, N.Y., 859-914, 1979.
J. Polym. Science, 42, 491-497, 1960.
Okamura et al., Journal of Polymer Science, C-16, pp. 2365-2377 (1967).
Fodor et al., J. Macromol. Sci. Chem. A 24, 735-47 (1987).
Kennedy et al., Polymer Bulletin, 13, pp. 343-348 (1985).
Kennedy et al., Polymer Bulletin, 13, pp. 441-446 (1985).
Kaszas et al., Journal of Macromolecular Science Chemistry 1982, vol. A-18, pp. 1367-82.
Cramer et al., Angew, Chem., Int. Ed. English, vol. 5, p. 601 (1966).
Hayatsu et al., J. Am. Chem. Soc. vol. 88, 1966, pp. 3182-3183.
L. R. Melby et al., J. Am. Chem. Soc., vol. 89, 1967, pp. 450-3.

*Primary Examiner*—Fred Teskin
*Attorney, Agent, or Firm*—Sughrue, Mion, Zinn, Macpeak & Seas

[57] ABSTRACT

Novel styrene derivatives are disclosed of the formula:

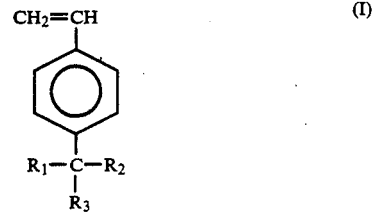

(I)

wherein $R_1$ and $R_2$ are the same or different and each represents a saturated aliphatic hydrocarbon group or an aromatic hydrocarbon group, and $R_3$ is —OH, Cl, or a group of the formula —OR$_4$ or

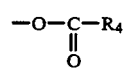

wherein $R_4$ represents a saturated aliphatic hydrocarbon group or an aromatic hydrocarbon group. The functionalized styrene monomers I as well as polymers and copolymers incorporating such monomer units are useful as initiators, or precursors thereof, for the polymerization of isobutylene under cationic conditions to give graft copolymers containing both styrenic and isobutylenic units. These copolymers have commercial applications such as rubbers, coatings, and luricants.

10 Claims, No Drawings

PREPARATION OF GRAFT COPOLYMERS FROM MACROMOLECULES CONTAINING REACTIVE TERTIARY STRUCTURES

This is a division of application Ser. No. 07/152,720, filed Feb. 5, 1988, now U.S. Pat. No. 5,084,522.

FIELD OF THE INVENTION

This invention relates to novel functionalized styrene derivatives, including both monomers and polymer or copolymers, and their use in preparing copolymers containing cationic grafts pendant from the main polymer or copolymer chain, which chain (prior to cationic grafting) possessed tertiary reactive moieties in the repeating units. Such graft copolymers may, for example, contain significant amounts of both styrenic and isobutylenic units.

BACKGROUND OF THE INVENTION

Styrene and isobutylene are two monomers which are difficult to copolymerize satisfactorily, as styrene does not generally polymerize well cationically (but quite well anionically or through radical polymerization) while isobutylene essentially polymerizes only under cationic conditions. Attempts at cationic polymerization of styrene have generally led to low molecular weight materials due to the prevalence of chain transfer reactions and thus copolymerizations with isobutylene have hitherto not afforded materials with satisfactory properties.

The cationic copolymerization of styrene with isobutylene to afford copolymers containing both monomers in the same chain has been studied extensively by Okamura et al who reported in the Journal of Polymer Science, C-b 16, 16, pp 2365-2377 (1967) that, although copolymers can be obtained, the prevailing cross-transfer reactions generally lead to low molecular weight materials. This process cannot be used to prepare graft copolymers.

Fodor et al, J. Macromol. Sci. Chem. A 24, 735-47(1987) have recently reported on the preparation of block copolymers of isobutylene and styrene by sequential cationic polymerization of the monomers at −90° C. However, the polymers which were obtained lacked purity and their molecular weights could not be controlled. The block copolymers which were obtained generally had low molecular weights and poor mechanical properties. This process was not applicable to the preparation of polyisobutylene grafts onto a polystyrene backbone.

Kennedy et al, Polymer bulletin, 13, pp 343-348 (1985) have also described the preparation of a graft copolymer of styrene and isobutylene by the macromer technique. In this process a polyisobutylene macromer terminated by a styrene residue was prepared, then copolymerized with styrene or methyl methyacrylate. However, the ability of the polyisobutylene macromonomer to copolymerize with styrene was found to depend on its molecular weight as evidenced by large variations in its reactivity ratio depending on conditions. In addition, the microphase separation which occurred at higher conversions prevented the regular distribution of the macromer units throughout the polystyrene chains. In a further report, Kennedy et al [Polymer Bulletin 13, pp 441-446 (1985)] describe the same copolymerization of styrene-terminated polyisobutylene with styrene in an aqueous emulsion. Here again the final polymer appears to have segregated polystyrene and polyisobutylene phases as the copolymerization is not homogeneous. This technique, which is limited as it cannot be applied to a broad spectrum of compositions, morphologies, and molecular weights of the two chain components, nevertheless leads to copolymers having improved mechanical properties.

In Kaszas et al, Journal of Macromolecular Science Chemistry, 1987, Vol. A-18, pp. 1367-82 the forced ideal copolymerization of isobutylene with styrene under quasi-living carbocationic conditions is described. This technique affords copolymers in which both monomers are in the same chain rather than grafted. Only a few compositions can be achieved and the process lacks versatility and is difficult to carry out.

U.S. Pat. No. 4,107,238 (1978) (Roper et al) reports on an anionic grafting of styrene onto cyclopentadiene-isobutylene-containing rubbers. The complex lithiation process involving butyl lithium and tetramethylethylene diamine is not directly applicable to the grafting of standard isobutylene fragments to polystyrene. German Patent No. 2,236,384 (1973) (Marek et al), describes a process which may be used to prepare copolymers containing some styrene and isobutylene in the same chain using titanium or vanadium based catalysts and irradiation. A complex chemical modification procedure based on a phenyl terminated polyisobutylene is described in German Patent No. 2,161,859 (1972) (Jean Peryot) to prepare a "graft" copolymer (actually a block copolymer containing one segment of polyisobutylene linked to one segment of polystyrene. Although this process is limited in its versatility, since true grafts of polyisobutylene onto polystyrene cannot be formed, it is nevertheless interesting as it describes a technique allowing the growth of a polystyrene chain from the extremity of a phenyl-terminated polyisobutylene.

F. Cramer et al, Angew, Chem., Int. Ed. English, Vol. 5, 1966, page 601, describe the synthesis of a polymer containing a monomethoxy-trityl pendant group by benzoylation of polystyrene followed by reaction with a Grignard reagent. The polymer was used as a carrier for oligonucleotide synthesis.

H. Hayatsu et al, J. Am. Chem. Soc. Vol. 88, 1966, pages 3182-3183, report the preparation of exactly the same polymer as F. Cramer et al by essentially the same routine. This was also reported more fully by the same author in J. Am. Chem. Soc. 89, 1967, 3880-87. In addition, L. R. Melby et al, J. Am. Chem. Soc. Vol. 89, 1967, 450-3 report the preparation of the same polymer as F. Cramer from a crosslinked insoluble polystyrene-divinylbenzene resin. Synthesis is via lithiation (n-butyl lithium). The polymer is used in oligonucleotide synthesis employing the chloride derivative as support. Finally, J. M. J. Frechet and K. E. Haque, Tetrahedron Letters 1975, pages 3055-3056, report the preparation of a crosslinked styrene-divinylbenzene resin containing

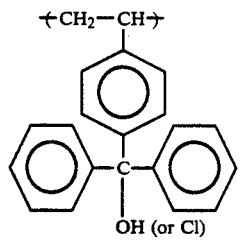

groups by benzoylation of the insoluble polystyrene resin followed by a Grignard reaction.

SUMMARY OF THE INVENTION

It is an object of the present invention to provide a simple and economical means of preparing copolymers containing cationic grafts originating from tertiary reactive centres located pendant to the main polymer or copolymer chain, for example, copolymers having improved properties over existing materials and containing both styrene and isobutylene in a wide range of proportions with excellent control over the molecular weight of both the starting polymer or copolymer and of the grafted arms.

Accordingly, one aspect of the invention provides a styrene derivative having the formula:

 (I)

wherein $R_1$ and $R_2$ are the same or different and each represents a saturated aliphatic hydrocarbon group or an aromatic hydrocarbon group, and $R_3$ is —OH, Cl, or a group of the formula —$OR_4$ or $$-O-\underset{\underset{O}{\|}}{C}-R_4$$

wherein $R_4$ represents a saturated aliphatic hydrocarbon group or an aromatic hydrocarbon group.

Groups $R_1$, $R_2$ and $R_4$ which each represent a saturated aliphatic or aromatic hydrocarbon group are preferably straight chain or branched alkyl having from 1 to 10 carbon atoms, aryl, aralkyl or alkaryl. Preferred alkyl groups include methyl, ethyl, propyl and butyl. Preferred aromatic groups include phenyl, benzyl and phenethyl and substituted phenyl in which the phenyl substituent(s) do not contain labile hydrogens or basic moieties which are well-known in the art to interfere with cationic polymerizations.

Group $R_3$ is preferably hydroxyl, chlorine, methoxy, ethoxy or acetoxy.

Thus, a particularly preferred group of styrene derivatives of the invention are those compounds of the formula:

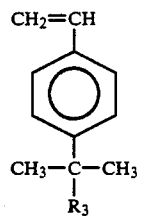 (II)

wherein $R_3$ represents hydroxyl, chlorine, methoxy or acetoxy.

DETAILED DESCRIPTION OF THE INVENTION

The styrene derivatives of formula I in which $R_3$ represents hydroxyl can be prepared by formation of a Grignard reagant from a 4-halogenated styrene using magnesium metal, followed by reaction of this Grignard reagent with a ketone which affords the tertiary alcohol I in which $R_3$=OH. An alternative procedure involves the paraacylation of a 2-haloethylbezene followed by dehydrohalogenation using techniques well known in the art to generate the p-acylated styrene which can then be treated with an appropriate Grignard reagent (such as $R_1MgX$ or $R_2MgX$ in which X is a halogen such as Cl or Br or with an alkyl lithium of the formula $R_1Li$ or $R_2Li$.

Once the hydroxylated monomer I ($R_3$=OH) has been prepared it can be transformed into the corresponding chloride I (R=Cl) by chlorination of the tertiary alcohol I, for example by reaction with a slurry of phosphorus pentachloride and calcium carbonate in dry chloroform at 0°.

Similarly, etherification or esterification of hydroxylated monomer I ($R_3$=OH) by methods well known in the art will afford compounds of formula I in which $R_3$=$OR_4$ or $$O-\underset{\underset{O}{\|}}{C}-R_4.$$

The compounds of formula I can be copolymerized with styrene by standard free-radical polymerization techniques to produce copolymers containing both monomers units and having the formula:

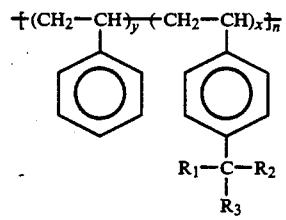 (III)

wherein $R_1$, $R_2$ and $R_3$ are as defined above, x and y are integers from 1 to about 2000 and n is an integer from 1 to about 1000. The styrene and substituted styrene units do not necessarily alternate, but can be present in any order and in any ratio to give a wide variety of compositions.

Copolymerization of monomer I may also be carried out with one or more other vinyl monomers to produce copolymers incorporating some units having the formula:

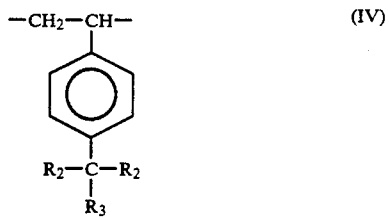

wherein $R_1$, $R_2$ and $R_3$ have the meanings defined above, as well as some units corresponding to the other vinyl monomer or monomers used.

Alternatively, copolymers containing reactive units of formula IV can also be prepared by chemical modification of polystyrene or of copolymers containing styrene units. For example, in the case of polystyrene, copolymers containing reactive units of formula IV in which $R_3$=OH can be obtained by acylation of polystyrene with an acid chloride of the formula $R_1COCl$ and $R_2COCl$ or acid anhydride of the formula $(R_1CO)_2O$ or $(R_2CO)_2O$ in the presence of a catalyst. The partly acylated polystyrene having the structure:

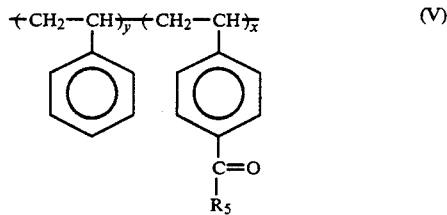

in which $R_5=R_1$ or $R_2$ and represents a saturated aliphatic or an aromatic hydrocarbon group, is then treated with an appropriate Gignard reagent of the formula $R_1MgX$ or $R_2MgX$ (X=Cl or Br) or an alkyl lithium of the formula $R_1Li$ or $R_2Li$, to afford a copolymer having structure III with $R_3$=OH.

Further transformation of this polymer to structure III in which $R_3$=Cl may be effected by chlorination, for example by treatment with concentrated hydrochloric acid, while standard esterification or etherification provides structure III in which

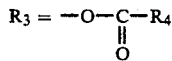

or —O—$R_4$.

Copolymers containing reactive pendant groups such as those of formula IV in which $R_3$ is Cl or —O—$R_4$ or

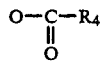

can be used in conjunction with a Lewis acid catalyst, such as boron trichloride or titanium tetrachloride to initiate the graft copolymerization of a "cationic" monomer such as isobutylene, styrene or substituted styrene, indene, or a vinyl ether.

The new monomer, such as isobutylene, becomes grafted forming side-chains originating at the tertiary carbon of the reactive pendant groups of the original copolymer. The length of the grafted chains are generally related to the relative proportions of added monomer to initiator units of formula IV on the starting polymer.

In a preferred embodiment the starting polymer has the structure of formula III containing from about 0.05 to 10% of the reactive units of formula IV interspersed among styrene molecules.

The amounts and proportions of the different monomers used in the various monomer feeds determine the structural, physical chemical, and mechanical properties of the final polymer. For example a polymer containing almost any percentage of styrene or of isobutylene can be prepared easily. The length of the styrenic or isobutylenic chains can be controlled at will and is not subject to the pitfalls of former methods as both polymerization reactions can proceed under near ideal conditions.

Copolymers containing the reactive pendant groups derived from monomers of formula I may also contain other monomer units such as substituted or unsubstituted styrenes and other simple vinyl compounds provided that these do not contain functionalities which are well known in the art to be incompatible with cationic polymerization and which may hinder or terminate prematurely cationic propagation during the grafting process. For example vinyl compounds containing reactive allylic structures or basic moieties would hinder the process through chain transfer or acid-base reactions.

DESCRIPTION OF PREFERRED EMBODIMENTS

The following Examples illustrate the invention.

EXAMPLE 1

Preparation of
1-(1-hydroxy-1-methylethyl)-4-etheneyl-benzene 20 g of previously dried magnesium turnings in a 500 ml flask containing 50 ml of dry distilled THF was treated dropwise with a solution of 27.6 g of distilled p-chlorostyrene in 100 ml of dry THF. Formation of the Grignard reagent was assisted through the addition of a crystal of iodine and 0.1 ml of methyl iodide with light external heating of the reaction vessel. A p-chlorostyrene solution was added at a rate sufficient to maintain the reaction and, once the addition was complete, the solution was refluxed for 60 minutes. After cooling, an excess of dry acetone (30 ml) was added dropwise and an exothermic reaction was observed to occur. After the addition was complete, stirring of the mixture under a nitrogen atmosphere was continued overnight. Workup of the reaction product was effected by pouring the reaction mixture into 1 L of saturated ammonium chloride solution and extracting twice with ether. The ether extracts were washed with a small amount of water, then dried over magnesium sulfate, filtered and evaporated. This procedure afforded 31.6 g (97.5%) of impure product. Purification was carried out by separation on a preparative HPLC with ethyl/acetate hexane eluent to afford 20.18 g (62.3%) of the desired compound in pure form.

EXAMPLE 2

Preparation of 1-(1-chloro-1-methylethyl)-4-ethenyl-benzene

A slurry of 27.7 g of phosphorus pentachloride and 10.2 g of finely powdered calcium carbonate in dry chloroform was cooled to 0° then treated rapidly with 16.2 g of 1-(1-hydroxy-1-methylethyl)-4-ethenyl-benzene with efficient stirring under a nitrogen atmosphere. After 3 minutes the mixture was filtered to remove all suspended solids then washed rapidly with cold water, dried over magnesium sulfate and evaporated to an oil which was purified by preparative HPLC using ethyl acetate-hexane as the eluent to afford 15.9 g (88%) of the desired chloride.

EXAMPLE 3

Preparation of 1-(1-methoxy-1-methylethyl)-4-ethenyl-benzene

A solution of 4.10 g of 1-(1-hydroxy-1-methylethyl)-4-ethenyl-benzene in 25 ml of dry tetrahydrofuran containing 7 g of iodomethane was heated to 40°–50° C. and treated portionwise in a dry atmosphere with 1 g of a sodium hydride dispersion (60% NaH in mineral oil) under rapid stirring. Reaction was accompanied by evolution of hydrogen. Once the addition was complete stirring was continued for another 30 minutes. The cooled mixture was then poured into water and extracted with ether. The organic phase was then washed with brine, dried over magnesium sulfate and evaporated to yield a crude product which was purified by preparative HPLC using ethyl acetate-hexane as the eluent to afford 2.25 g (51%) of the desired methyl ether.

EXAMPLE 4

Preparation of 1-(1-acetoxy-1-methylethyl)-4-ethenyl-benzene

A mixture of 6.7 g of 1-(1-hydroxy-1-methylethyl)-4-ethenyl-benzene and 4.0 g of pyridine in 100 ml of dichloromethane was stirred while 4.0 g of acetyl chloride in 20 ml of dichloromethane was added dropwise. After the addition was complete, the mixture was refluxed gently overnight. After cooling, an additional 30 ml of dichloromethane was added and the mixture was then washed with 50 ml of cold 5% aqueous HCl, and then several times with 30 ml portions of water. After drying over magnesium sulfate, filtering, and concentrating, the crude product was purified by HPLC using ethyl/acetate hexane as eluent. This method affords 4.05 g (47.5% yield) of the desired compound.

EXAMPLE 5

Copolymerization of styrene with 1-(1-acetoxy-1-methylethyl)-4-ethenyl-benzene A mixture of 1.0 g of 1-(1-acetoxy-1-methylethyl)-4-ethenyl-benzene and 9.0 g of styrene in 10 ml of toluene containing 0.100 g of azobis (isobutyronitrile) [AIBN] is stirred and heated at a temperature of 75° for 36 hours. After cooling, the polymer was diluted with 25 ml of toluene and precipitated into a 4 l of methanol. This affords 8.37 g (83.7% yield) of the desired copolymer. NMR analysis confirmed that the copolymer contains monomer units of both styrene and 1-(1-acetoxy-1-methyl ethyl)-4-ethenyl-benzene in a molar ratio of approximately 20:1. Molecular weight measurements (osmometry) showed that the copolymer had $\overline{M}n = 49,000$. Therefore the copolymer has a structure of formula III in which $R_1 = R_2 = CH_3$,

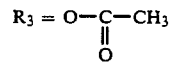

and x, y and n have the approximate values of 1, 20 and 21.

EXAMPLE 6

A copolymer prepared in similar manner to that described in Example 5 from 1.0 g of 1-(1-acetoxy-1-methyl ethyl)-4-ethenyl-benzene and 25 g of styrene with 0.080 g of AIBN as initiator and 25 ml of benzene as solvent had a molecular weight of 158,000 and a structure of formula III in which $R_1 = R_2 = CH_3$ and

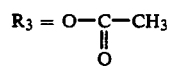

while x, y and n had the approximate values of 1, 49 and 30.

EXAMPLE 7

Copolymerization of 4-methylstyrene with 1-(1-chloro-1-methylethyl)-4-ethenyl-benzene A mixture of 1.0 g of 1-(1-chloro-1-methylethyl)-4-ethenyl-benzene and 11.7 g of 4-methylstyrene in 13 ml of toluene containing 0.110 g of AIBN was stirred and heated at 75° for 36 hours. After cooling, the viscous polymer was diluted with 27 ml of toluene and precipitated into 4 l of methanol to afford 11.3 g (89%) of the desired copolymer. NMR analysis confirmed that the desired structure had been obtained. Measurements of $\overline{M}n$ (osmometry) gave a value of 45,700 suggesting that the copolymer had the following structure:

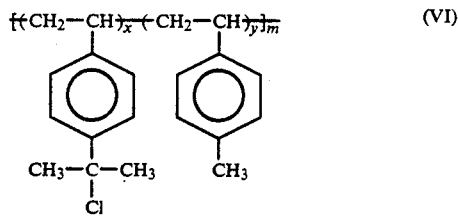

while x, y, and n had the respective approximate values: 1, 18 and 20.

EXAMPLE 8

Copolymerization of styrene with 1-(1-chloro-1-methylethyl)-4-ethenyl-benzene A mixture of 0.6 g of 1-(1-chloro-1-methylethyl)-4-ethenyl-benzene and 27.6 g of styrene in 28 ml of benzene containing 0.060 g of AIBN was stirred and heated to 75° for 36 hours. The very viscous polymer mass was then cooled, diluted with 50 ml of benzene and precipitated into 5 l of methanol to afford 26.4 of the desired copolymer (93%). Molecular weight measurements (osmometry) gave $\overline{M}n$ 179,000 suggesting that the copolymer had a structure of formula III in which $R_1 = R_2 = CH_3$ and $R_3 = Cl$, while x, y and n had the approximate values of 1, 80 and 21.

EXAMPLE 9

Cationic graft copolymerization of isobutylene onto the copolymer of Example 5

This graft polymerization was carried out under a controlled atmosphere using high vacuum techniques. A small glass reactor containing 0.50 g of the copolymer produced in Example 5 was dried under high vacuum for 2 hours. The reactor was then brought to atmospheric pressure under nitrogen and 20 ml of dichloromethane was injected onto the reactor. The solution was then cooled in liquid nitrogen and 0.5 ml of a solution of $BCl_3$ in dichloromethane was also injected and the reactor was then warmed to $-78°$ C. The solution was mixed and evacuated again after cooling to liquid nitrogen temperature. After warming to $-78°$ C., 340 g of isobutylene was added through a breakseal from an ampoule attached as a side arm to the reactor. After standing overnight the polymerization reactor was warmed and the polymer was precipitated into 500 ml of methanol to afford 3.4 g of the desired graft copolymer.

EXAMPLE 10

Cationic graft copolymerization of isobutylene onto the copolymer of Example 6

The graft copolymerization was carried out as described in Example 9, except that 1.2 g of the copolymer described in Example 6 and 1.0 g of isobutylene were used. The graft copolymer obtained after precipitation weighed 2.14 g, had spectral characteristics consistent with the proposed structure and a molecular weight $\overline{M}n = 277,000$ (osmometry) suggesting a formula such as:

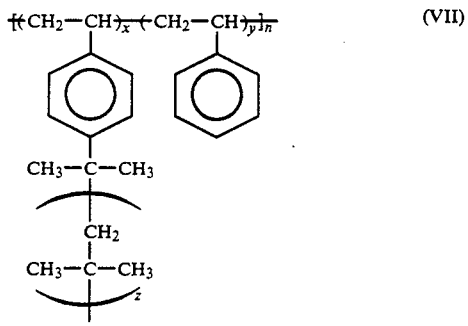

(VII)

in which each repeating unit contains approximately 49 unsubstituted styrene units for each substituted styrene unit to which is grafted a chain containing approximately 70 units of isobutylene given values of $x=1$, $y=49$, $z=70$ and $n=30$.

EXAMPLE 11

Preparation of polymers containing reactive units of formula IV by chemical modification of polystyrene A solution of 10.4 g of polystyrene having a nominal molecular weight of 600,000 in 180 ml of carbon disulfide was cooled to $0°$ C. then treated slowly with 1.0 g of anhydrous aluminum chloride and 1.0 g of acetyl chloride while stirring under a nitrogen atmosphere.

After stirring for 30 minutes at $0°$ C. the cooling bath was removed and stirring was continued at room temperature for another 60 minutes. 55 ml of ice-cold dilute HCl in water was then added, together with 100 ml of chloroform and the mixture was stirred for another 30 minutes then left to stand for 15 minutes. After separating the phases, the organic phase was washed with aqueous sodium bicarbonate until neutral. After a final aqueous wash, the solution was dried over anhydrous magnesium sulfate then concentrated under reduced pressure. After precipitation and reprecipitation into methanol, 10.2 g of partly acetylated polystyrene was obtained. Infrared and NMR analysis confirmed that acetylation had occurred on approximately one of every 25 styrene units in the polymer. This polymer therefore can be represented by the formula:

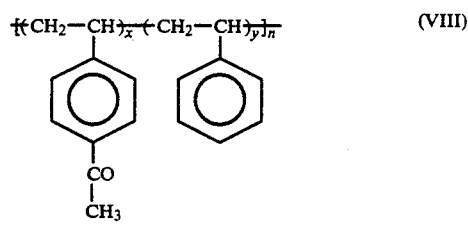

(VIII)

in which x was approximately equal to 1 and y was approximately equal to 25, while n was approximately equal to 220.

10 g of the acetylated polymer described above was dissolved in 160 ml of dry tetrahydrofuran and the stirred solution was treated slowly with an excess of methylmagnesium bromide (6 ml of 3M solution in tetrahydrofuran). Once the addition was complete, the stirred mixture was heated at $60°-70°$ for 2 hours, then treated slowly with 10 ml of acetone. After cooling to room temperature the thick polymer solution was poured and triturated into 1.5 l of aqueous ammonium chloride and trituration was continued overnight. The polymer was then re-dissolved in a minimum amount of dichloromethane and reprecipitated into methanol to afford 9.8 g of the desired polymer with pendant 1-hydroxy-1-methylethyl groups. IR and NMR analysis confirm that the product was a material having structure III in which $R_1=R_2=CH_3$ and $R_3=OH$, while x, y and n had the respective approximate values of 1, 25 and 220.

Further chemical modification of this polymer was accomplished as follows: A solution of 9.5 g of the polymer containing pendant 1-hydroxy-1-methylethyl groups in a mixture of 130 ml of toluene, 20 ml of dry pyridine, and 4 g of 4-dimethylamino pyridine was treated with 5 ml of acetic anhydride and the mixture was stirred and heated at $70°-80°$ C. for 4 hours. After the addition of another 5 ml of acetic anhydride and another 5 hours of stirring at $70°-80°$ C., the mixture was cooled and precipitated into methanol. After reprecipitation, 9.4 g of the desired polymer containing pendant 1-acetoxy-1-methylethyl groups was obtained. IR and NMR analysis confirmed that the material had structure III in which $R_1=R_2=CH_3$ and

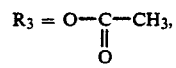

while x, y and n had the respective approximate values of 1, 25 and 220.

EXAMPLE 12

A similar acetylation procedure using 7 g of polystyrene (nominal $\overline{\mathrm{Mn}}=600{,}000$), 0.5 g of acetyl chloride and 0.46 g of anhydrous aluminium chloride afforded a polymer of formula VIII in which x, y and n had the approximate values of 1, 55 and 103.

EXAMPLE 13

A solution of 10.0 g of polystyrene (nominal molecular weight 125,000) in 60 ml of nitrobenzene was treated with 8.29 g of acetyl chloride under a nitrogen atmosphere. After cooling to 0° C., the solution was stirred with a mechanical stirrer while 7.41 g of $AlCl_3$ was added portionwise. After complete addition, the temperature was increased to 10° C. and stirring was continued until the mixture was homogeneous. Stirring was then continued for one hour at room temperature, and HCl was then removed from the reaction mixture by evacuation. The remaining material was then poured into 1 l of dilute ice cold HCl under strong stirring. After the addition of 0.5 l of dichloromethane and further stirring, a clear two-phase system was obtained. The organic layer was separated and washed with aqueous 5% $NaHCO_3$ until neutral. After a final aqueous wash, the organic phase was dried over magnesium sulfate then concentrated under reduced pressure. After two consecutive precipitations in methanol and drying in vacuo, 9.95 g of a styrenic polymer containing approximately 60% acetylated units was obtained. This polymer had structure VIII in which x, y and n had the approximate values of 3, 2 and 240.

What is claimed is:

1. A process for grafting a monomer susceptible to cationic polymerization, which comprises contacting a polymer or copolymer containing reactive pendant groups having the formula:

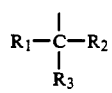
(IX)

wherein $R_1$ and $R_2$ each represents a saturated aliphatic hydrocarbon group or an aromatic hydrocarbon group, and $R_3$ is Cl, or a group of the formula $-OR_4$ or

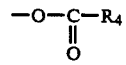

wherein $R_4$ represents a saturated aliphatic hydrocarbon group or an aromatic hydrocarbon group, with a monomer susceptible to cationic polymerization in the presence of a Lewis acid catalyst.

2. A process according to claim 1, wherein the monomer susceptible to cationic polymerization is isobutylene, styrene, a substituted styrene, indene or a vinyl ether.

3. A process according to claim 1, wherein the monomer susceptible to cationic polymerization is isobutylene.

4. A process according to claim 2, wherein the Lewis acid is boron trichloride or titanium tetrachloride.

5. A process according to claim 3, wherein the Lewis acid is boron trichloride or titanium tetrachloride.

6. A process according to claim 1, wherein the polymer or copolymer containing groups of formula IX is a styrenic polymer or copolymer.

7. A process according to claim 1, wherein $R_1$ and $R_2$ each represent methyl and $R_3$ represents chlorine, methoxy or acetoxy.

8. A polymerization process which comprises contacting a polymer or copolymer, which contains in the polymer chain monomer units of the formula:

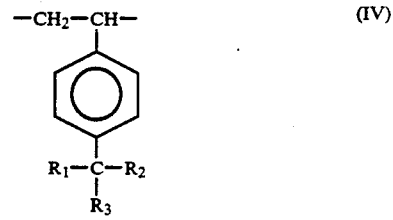
(IV)

wherein $R_1$ and $R_2$ each represents a saturated aliphatic hydrocarbon group or an aromatic hydrocarbon group and $R_3$ is $-OH$, Cl or a group of the formula $-OR_4$ or

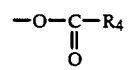

wherein $R_4$ represents a saturated aliphatic hydrocarbon group or an aromatic hydrocarbon group, with a Lewis acid, and utilizing the product to initiate the polymerization of a monomer selected from styrene, α-methyl-styrene, ring-alkylated styrenes, vinyl ethers and isobutylene.

9. A graft polymerization process, which comprises contacting a polymer or copolymer, which contains in the polymer chain monomer units of the formula:

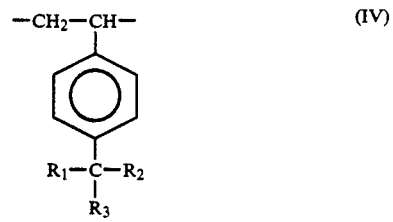
(IV)

wherein $R_1$ and $R_2$ each represents methyl and $R_3$ represents chlorine, methoxy or acetoxy, with boron trichloride or titanium tetrachloride and thereafter utilizing the product to initiate polymerization with isobutylene.

10. A polymerization process which comprises contacting a polymer or copolymer, which contains in the polymer chain monomer units of the formula:

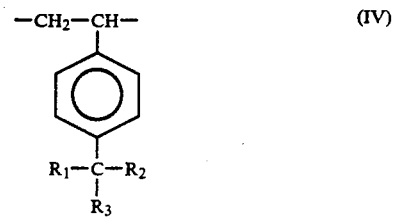
(IV)

wherein $R_1$ and $R_2$ each represents a saturated aliphatic hydrocarbon group or an aromatic hydrocarbon and $R_3$ is —OH, Cl or a group of the formula —$OR_4$ or

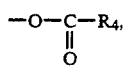

wherein $R_4$ represents a saturated aliphatic hydrogen group or an aromatic hydrocarbon group, with a Lewis Acid catalyst selected from boron trichloride and titanium tetrachloride, and utilizing the product to initiate the polymerization of a monomer selected from styrene, α-methyl-styrene, ring-alkylated styrenes, vinyl ethers and isobutylene.

* * * * *